United States Patent Office 3,704,251
Patented Nov. 28, 1972

3,704,251
PRODUCTION OF PHENYL-MALEIC ANHYDRIDE BY CATALYTIC VAPOR PHASE OXIDATION OF BIPHENYL OR SEC-BUTYL BENZENE
Theodor Vrbaski, Harvey, Bernard C. Vitchus, Riverdale, and Robert Koncos, Park Forest, Ill., assignors to Sinclair Oil Corporation
No Drawing. Filed July 22, 1968, Ser. No. 746,294
Int. Cl. C07c 63/02
U.S. Cl. 260—346.8                                  14 Claims

ABSTRACT OF THE DISCLOSURE

A process for the catalytic vapor phase oxidation of an aromatic hydrocarbon, which can be biphenyl or sec-butyl benzene, to produce phenyl-maleic anhydride which comprises oxidizing said aromatic hydrocarbon in the vapor phase at a temperature of about 350 to 480° C. with molecular oxygen-containing gas in the presence of an oxidation catalyst comprising an oxide of a Group Vb metal, i.e. the vanadium group, which can be promoted with potassium sulfate.

---

This invention relates to the vapor phase oxidation of aromatic compounds and more particularly relates to the vapor phase oxidation of biphenyl or sec-butyl benzene in the presence of a catalyst comprising an oxide of one or more of the Group Vb metals of the Periodic Table of elements to produce phenyl-maleic anhydride.

Phenyl-maleic anhydride can be prepared by photochlorination of a solution of benzene and maleic anhydride. This process, however, is not advantageous because the conversion to phenyl-maleic anhydride is low, i.e. 30 percent to the crude and 18 percent to the purified product, and the purification of the product is complicated by the presence of various chlorinated by-products. Another method for preparing phenyl-maleic anhydride involves reacting phenyl-succinic acid with acetic anhydride and selenium dioxide, followed by treatment in vacuum and trituration with ether. Similarly, phenyl-maleic anhydride can be formed from phenyl-succinic anhydride and N-bromo-succinimide in the presence of a catalytic amount of benzoyl peroxide. These processes are also disadvantageous because of the complexity of the synthesis involved in making the starting material, phenyl-succinic acid or anhydride. Thus, an illustrative method of preparing the reactant, phenyl-succinic anhydride, involves reacting cyanoacetic acid with benzaldehyde, esterifying the alpha-cyano-beta-phenyl-acrylic acid so obtained, reacting the ester with sodium cyanide to produce ethyl-alpha,beta-dicyano-beta-phenyl-propionate, and subjecting the latter compound to hydrolysis to obtain phenyl-succinic acid which converts to the anhydride by the action of acetyl chloride or acetic anhydride. Other processes for preparing phenyl maleic anhydride are disclosed in the art but they are similarly complicated.

The process of this invention is a novel, vapor phase, catalytic oxidation of biphenyl or sec-butyl benzene, to produce phenyl-maleic anhydride which avoids problems associated with prior are processes for making phenyl-maleic anhydride. The process of the present invention is further advantageous since both biphenyl and sec-butyl benzene are commercially available products. Biphenyl is produced from benzene in 90 percent yields cheaply and easily. Sec-butyl benzene is produced by alkylation of benzene and is also a readily available material. This ready availability of reactants makes the novel process of this invention advantageous for producing phenyl-maleic anhydride by vapor phase oxidation of biphenyl and sec-butyl benzene.

In accordance with the present invention, phenyl-maleic anhydride is prepared by conducting vapor phase oxidation of biphenyl or sec-butyl benzene in the presence of molecular oxygen-containing gas, e.g. air, and a suitable oxidation catalyst. The catalyst comprises an oxide, or a mixture of oxides, of one or more of the Group Vb metals of the Periodic Table of elements, i.e. the vanadium group. Advantageously, it can be provided with a minor, promotional amount, e.g. about 1 to 15 wt. percent, preferably about 4 to 12 wt. percent, of potassium sulfate based on the combined weight of the oxide of the Group Vb metal and potassium sulfate. Preferably, the Group Vb metal oxide is vanadium pentoxide. The catalyst metal component or components are preferably fused in order that the catalyst has a low surface area, for instance, of less than one square meter per gram. The catalyst can be supported or unsupported. Fusion of the catalyst can be simply effected by heating to a temperature above the melting point of the Group Vb metal oxide or of the mixture of such oxides and, if employed, the potassium sulfate promoter. Fusion temperatures of about 550 to 900° C., often about 700 to 750° C., are generally suitable for preparing fused blends of, for instance, vanadium pentoxide and potassium sulfate. Although the melting point of potassium sulfate is relatively high, that is about 1074° C. as compared to that of vanadium pentoxide which is about 690° C., it has been found that blends of the two materials containing as high as 20 weight percent potassium sulfate can readily be fused at temperatures well below 600° C., due to the formation of eutectic mixtures. When the blend is cooled, the melt solidifies into a homogeneous mass. Subsequently the mass can be crushed to produce a catalyst, for instance, in the mesh size range of about 8 to 10. The catalyst prepared according to the above method exhibits substantial attrition-resistant properties during use in the catalytic vapor phase oxidation process.

In a particularly advantageous embodiment of this invention, the catalyst used is one prepared by depositing a blend of the Group Vb metal oxide or oxides and, if employed, the potassium sulfate on a low surface area solid support, e.g., having a surface area of up to about 100 and preferably up to about 25 square meters per gram. Useful supports include, for example, silica, alpha-alumina (e.g., corundum), silicon carbide, zeolites, asbestos, graphite, pumice, quartz, kieselguhr, silica gel and the like.

Where the catalyst is to be deposited on a carrier, the Group Vb metal oxide or oxides and potassium sulfate may be added by any of the conventional manufacturing methods. Included among these methods are thermal decomposition of an unstable Group Vb metal compound, such as a vanadium compound; impregnation of the carrier with molten metal salt or salts; precipitation from a colloidal suspension of the metal salt or salts in an inert liquid; or, preferably, impregnation of the carrier with a slurry or solution containing the catalytic metal salt or salts. For instance, a suitable catalyst may be prepared by reacting vanadium pentoxide or ammonium vanadate with sulfur dioxide or a carboxylic acid such as oxalic, citric, tartaric or maleic acids to produce a water-soluble vanadyl salt. Preferably, vanadyl sulfate is employed. To an aqueous solution of, say, vanadyl sulfate, may be added the potassium sulfate, if such is to be employed. The resulting solution of vanadyl sulfate or vanadyl sulfate and potassium sulfate may then be used to impregnate a carrier. After impregnation, the water is evaporated and the residue is heat-treated at a temperature of about 700 to 750° C. for a period of, say, about 2 to 8 hours, preferably about 4 hours. Catalysts so prepared are characterized by a fused, uniform coating of the active material on the carrier surface and by satisfactory abrasion-resistant properties. Preferably, in fixed bed, vapor phase processes the catalyst is generally in the form of discrete macrosize particles, preferably of from about 3 to 10 mesh size, in the shape of pills, pellets, cylinders, beads, extrudates, granules, or the like.

The operating conditions which give favorable yields for the vapor phase oxidation of the aromatic feedstock may vary widely. The oxidation is generally conducted at atmospheric pressure and elevated temperatures. The pressure can be conveniently atmospheric or slightly above atmospheric. While higher pressures may be used, there is no particular advantage in substantial higher pressures. A suitable oxidation temperature, for example, is within the range of about 350 to 480° C., preferably about 400 to 450° C. The weight hourly space velocity is often about 0.02 to 0.10 hr.$^{-1}$ with a volumetric hourly space velocity of about 600 to 10,000 hr.$^{-1}$, preferably about 2000 to 4000 hr.$^{-1}$. A suitable volumetric hourly space velocity, VHSV, for the aromatic hydrocarbon oxidation over vanadium pentoxide can be 36,000 (=0.1 sec. contact time), and if vanadium pentoxide is blended with potassium sulfate, the VHSV is advantageously lower. VHSV is defined as the volume of feed gas at the reaction temperature per void volume of catalyst bed. Void volume for a vanadium pentoxide packed reactor used in the examples is about 60% (.60 ml. per 1 ml. catalyst bed). The maintenance of the space velocity within these ranges is advantageous in the production of the desired phenylmaleic anhydride and the avoidance of the production of by-products. In carrying out the oxidation, it is preferable to use a gas mixture containing about 0.2 to 1 vol. percent of hydrocarbon in air and to preheat it to within a few degrees of the reactor temperature before introduction into the reaction zone, for example, to a temperature of about 350 to 480° C. This hydrocarbon-air mixture provides an approximate oxygen to hydrocarbon mole ratio of about 20:1 to 100:1.

The following examples are illustrative of the process of this invention and of preferred embodiments thereof.

EXAMPLE I

An all-glass flow apparatus was used which comprised a flow-metering section, evaporator, gas carburetor, reactor and product-collecting section. Primary and secondary input air streams were used and were measured by capillary flow meters. The addition of the organic feed to the system was performed by saturation of the primary air stream with the hydrocarbon vapors in the evaporator at a fixed temperature controlled to ±0.1° C. Secondary air was introduced and the mixture (primary air plus hydrocarbon plus secondary air) was mixed in the gas carburetor and then passed to the reactor which comprised a preheating section and a reaction chamber. The preheat section, where the mixture was preheated to a suitable temperature, was 1 mm. capillary tubing, 20 cm. in length. The reaction chamber had a volume of 5.0 ml., was of annular design having an I.D. of 11.3 mm. and was equipped with a thermowell. The reactor was immersed in an electrically heated and stirred bath of a low-melting salt. The temperature was controlled to ±0.5° C.

The reactor was packed with about 6.8 g. of an unsupported, fused vanadium pentoxide catalyst. The catalyst was in the form of granules having a particle size of about 8 to 10 mesh. The catalyst was mechanically stable and resisted disintegration during use in the reactor.

Effluent gases from the reactor were passed through a glass air-condenser, two Dry-Ice traps, a water scrubber and were finally metered through a wet-test meter. Determinations of carbon oxides in the gas were carried out by gas chromatography. The condensed products were analyzed by conventional methods such as mass spectrometry, gas chromatography and volumetry. The identtiy of phenylmaleic anhydride was determined by mass spectrometric analysis of the condenser freeze-out. The melting point of the purified compound was 119–120° C.

In the apparatus described above, a gas mixture containing 0.75 volume percent biphenyl in air was oxidized at a space velocity of 3270 hr.$^{-1}$ and a temperature of 434° C. using the catalyst described above. The conversion of biphenyl was 92.8 wt. percent. The product contained a substantial amount of phenyl-maleic anhydride, and the by-products comprised maleic anhdride, benzoic acid, phthalic anhydride, and carbon oxides.

EXAMPLE II

In the apparatus described in Example I, a gas mixture containing 0.70 vol. percent sec-butyl benzene in air was oxidized at a space velocity of 3530 hr.$^{-1}$ and a temperature of 407° C. using the same catalyst as described in Example I. The conversion of sec-butyl benzene was 75.6 wt. percent. The yield of phenyl-maleic anhydride was again substantial and the product also contained benzoic acid, phthalic anhydride, maleic anhydride, and carbon oxides.

EXAMPLE III

In the apparatus described in Example I, a gas mixture containing 0.75 vol. percent sec-butyl benzene in air was oxidized at a space velocity of 3470 hr.$^{-1}$ and a temperature of 443° C. using a catalyst prepared by impregnating a corundum support with an aqueous solution containing 10 parts by weight of vanadyl sulfate (calculated as vanadium pentoxide) per part of potassium sulfate. The corundum support was sufficiently impregnated to provide, after calcining at 700° C. for 4 hrs., a composition containing 10 wt. percent combined vanadium pentoxide and potassium sulfate based on the weight of the corundum support. The conversion of sec-butyl benzene was 97.9 wt. percent. The product contained a large amount of phenyl-maleic anhydride, as well as benzoic acid, phthalic anhydride, maleic anhydride and carbon oxides as by-products.

It is claimed:

1. A process for the catalytic vapor phase oxidation of an aromatic hydrocarbon selected from the group consisting of biphenyl and sec-butyl benzene to produce phenyl-maleic anhydride, which comprises oxidizing said aromatic hydrocarbon in the vapor phase at a temperature of about 350 to 480° C. with molecular oxygen-containing gas in the presence of an oxidation catalyst consisting of an oxide of vanadium, and recovering phenyl-maleic anhydride.

2. The process of claim 1 wherein the oxidation catalyst consists of fused vanadium pentoxide.

3. The process of claim 2 wherein the catalyst is supported on a carrier material having a surface area of up to about 25 sq. meters per gm.

4. The process of claim 3 wherein the catalyst contains potassium sulfate in a promotional amount of about 1 to 15 wt. percent based on the combined weight of the fused vanadium oxide and potassium sulfate.

5. The process of claim 4 wherein the carrier material is alpha-alumina.

6. The process of claim 1 wherein the oxidation catalyst consists of an unsupported, fused potassium sulfate-promoted vanadium oxide, said potassium sulfate being present in the catalyst in a promotional amount of about 1 to 15 wt. percent based on the combined weight of the vanadium oxide and potassium sulfate.

7. The process of claim 6 wherein the oxide is vanadium pentoxide.

8. The process of claim 1 wherein the aromatic hydrocarbon is biphenyl.

9. The process of claim 8 wherein the oxidation reaction is conducted at a temperature of about 350 to 480°

C. and a volumetric hourly space velocity of about 600 to 10,000 hr.$^{-1}$.

10. The process of claim 1 wherein the aromatic hydrocarbon is sec-butyl benzene.

11. The process of claim 10 wherein the oxidation reaction is conducted at a temperature of about 350 to 480° C. and a volumetric hourly space velocity of about 600 to 10,000 hr.$^{-1}$.

12. A process for the catalytic vapor phase oxidation of biphenyl to produce phenyl-maleic anhydride which comprises oxidizing the biphenyl in the vapor phase at a temperature of about 400 to 450° C., a volumetric hourly space velocity of about 2000 to 4000 hr.$^{-1}$ with molecular oxygen-containing gas in the presence of an oxidation catalyst consisting of fused vanadium pentoxide, the mole ratio of oxygen, in said oxygen-containing gas, to biphenyl being about 20:1 to 100:1, and recovering phenyl-maleic anhydride.

13. A process for the catalytic vapor phase oxidation of sec-butyl benzene to produce phenyl-maleic anhydride which comprises oxidizing the sec-butyl benzene in the vapor phase at a temperature of about 400 to 450° C., a volumetric hourly space velocity of about 2000 to 4000 hr.$^{-1}$ with molecular oxygen-containing gas in the presence of an oxidation catalyst consisting of fused vanadium pentoxide, the mole ratio of oxygen, in said oxygen-containing gas, to sec-butyl benzene being about 20:1 to 100:1 and recovering phenyl-maleic anhydride.

14. A process for the catalytic vapor phase oxidation of sec-butyl benzene to produce phenyl-maleic anhydride which comprises oxidizing the sec-butyl benzene in the vapor phase at a temperature of about 400 to 450° C., a volumetric hourly space velocity of about 2000 to 4000 hr.$^{-1}$ with molecular oxygen containing gas in the presence of an oxidation catalyst consisting of fused potassium sulfate-promoted vanadium pentoxide supported on alpha-alumina, said potassium sulfate being present in the catalyst in a promotional amount of about 4 to 12 wt. percent based on the combined weight of the vanadium pentoxide and potassium sulfate, the mole ratio of oxygen, in said oxygen-containing gas, to sec-butyl benzene being about 20:1 to 100:1, and recovering phenyl-maleic anhydride.

References Cited

Morita—Chemical Abstracts (1960), vol. 55, p. 9359b.

ALEX MAZEL, Primary Examiner

B. DENTZ, Assistant Examiner